United States Patent
Konishi

[11] Patent Number: 5,950,036
[45] Date of Patent: Sep. 7, 1999

[54] IMAGE PROCESSING APPARATUS HAVING CALIBRATION CONTROL AND RELATED METHOD

[75] Inventor: Jun Konishi, Kanagawa-ken, Japan

[73] Assignee: Canon Kabushiki Kaisha, Tokyo, Japan

[21] Appl. No.: 08/911,027

[22] Filed: Aug. 14, 1997

[30] Foreign Application Priority Data

Aug. 23, 1996 [JP] Japan .................................. 8-222762
Aug. 8, 1997 [JP] Japan .................................. 9-214957

[51] Int. Cl.$^6$ .................................................. G03G 15/00
[52] U.S. Cl. ................................ 399/8; 399/11; 399/43; 399/77
[58] Field of Search .................................. 399/8–11, 43, 399/76–78; 358/406; 379/102.1

[56] References Cited

U.S. PATENT DOCUMENTS

| | | | |
|---|---|---|---|
| 5,305,058 | 4/1994 | Sulenski et al. | 399/159 |
| 5,309,257 | 5/1994 | Bonino et al. | 358/504 |
| 5,394,251 | 2/1995 | Aikens | 399/8 X |
| 5,613,047 | 3/1997 | Shimomura et al. | 399/9 X |
| 5,673,106 | 9/1997 | Thompson | 399/9 |

FOREIGN PATENT DOCUMENTS

| | | |
|---|---|---|
| 0 650 291 | 4/1995 | European Pat. Off. . |
| 0 654 757 | 5/1995 | European Pat. Off. . |
| 679016 | 10/1995 | European Pat. Off. . |
| 2 288 508 | 10/1995 | United Kingdom . |
| 96/16506 | 5/1996 | WIPO . |

*Primary Examiner*—William Royer
*Attorney, Agent, or Firm*—Fitzpatrick, Cella, Harper & Scinto

[57] ABSTRACT

A host computer does not instruct to initiate calibration immediately when calibration is requested by a printer. The host computer instructs to initiate calibration at time which is designated by an operator. As for the execution time of calibration to be designated, time right after calibration is requested, and time when a printing job is completed are included. Further, when automatic determination for determining execution time of calibration is designated, the execution time is determined on the basis of state of a printing job to be executed, or state of a printing job in progress. As for the state of a printing job, there are the number of remaining pages of the printing job, color printing or monochromatic printing, whether image data is included or not, for example. Accordingly, depending upon the state of the printing job, an optimized execution time of calibration is determined.

18 Claims, 14 Drawing Sheets

FIG.2

CALIBRATION SETTING

☐ EXECUTE IMMEDIATELY

☐ EXECUTE AFTER COMPLETING JOB

☐ AUTOMATIC

☑ EXECUTE DEPENDING UPON
   THE NUMBER OF REMAINING PAGES    IF EQUAL OR MORE THAN [10] PAGES
                                    ARE LEFT, EXECUTE IMMEDIATELY OTHERWISE,
                                    EXECUTE AFTER COMPLETING JOB

IMAGE PROCESSING APPARATUS HAVING CALIBRATION CONTROL AND RELATED METHOD

BACKGROUND OF THE INVENTION

The present invention relates to an image processing apparatus and method for controlling calibration.

In a conventional printing apparatus, in order to correspond to change and deterioration of formed visual images due to change in environmental conditions and attrition of parts of the printing apparatus, correction processing of an engine unit which is for forming visual images, namely, calibration is performed. Thus, changes in the formed images are corrected, thereby quality of the formed images is maintained. Calibration of a printer is performed by comparing an image to be printed to an actually printed image, and correcting the output characteristics of the printer by the difference between the two images. The calibration has become an indispensable process as resolution of printers increases and more printers print color images.

However, in the aforesaid printing apparatus, calibration is performed in the engine unit without notifying a user as to when the calibration is performed, and a user can not control the calibration. Therefore, there is a problem in which, even when a user wants to execute an urgent printing job, the user has to wait until calibration is completed once the calibration starts.

SUMMARY OF THE INVENTION

The present invention has been made in consideration of the above situation, and has as its object to provide an image processing apparatus and method capable of controlling execution time of calibration so as to be performed at an optimal time.

According to the present invention, the foregoing object is attained by providing an image processing apparatus for controlling a printer having a calibration function by performing bidirectional communication with the printer, the apparatus comprising: setting means for setting an execution condition of calibration; and control means for controlling the performance of calibration based on the execution condition set by the setting means when calibration is requested by the printer.

Further, according to the present invention, the foregoing object is also attained by providing an image processing method for controlling a printer having a calibration function, comprising: a setting step of setting an execution condition of calibration; and a control step of controlling the performance of calibration based on the execution condition set in the setting step when calibration is requested by the printer.

Furthermore, the foregoing object is also attained by providing computer-executable process steps for controlling a printer having a calibration function, stored on a computer readable medium, the process steps comprising: a setting step of setting an execution condition of calibration; and a control step of controlling the performance of calibration based on the execution condition set in the setting step when calibration is requested by the printer.

Further, according to the present invention, the foregoing object is also attained by providing an image processing apparatus having communication means for communicating with an image output apparatus, comprising: reception means for receiving a request for calibration; output means for outputting a calibration execution command to the image output apparatus via the communication means; determination means for determining a state of a printing job; and control means for controlling a time for outputting the calibration execution command.

Further, according to the present invention, the foregoing object is also attained by providing an image processing method comprising the steps of: receiving a calibration request from image output means; determining a state of a printing job; outputting a calibration execution command to the image output means at a time determined on the basis of the state of the printing job.

Further, according to the present invention, the foregoing object is also attained by providing computer-executable process steps stored on a computer readable medium, the process steps comprising: a receiving step to receive a calibration request; an outputting step to output a calibration execution command to an image output apparatus; a determining step to determine a state of a printing job; and a controlling step to control the time for outputting the calibration execution command.

According to the image processing apparatus and method of the present invention as described above, it is possible to control the execution time of calibration. Therefore, depending upon the types of printing jobs, e.g., an urgent printing job and a printing job requiring quality, and the conditions of the printing apparatus, it is possible to achieve an optimized operational environment for each printing job.

Further, when there is no instruction to perform calibration by a user, it is possible to determine an optimal execution time for calibration depending upon each printing job and printing conditions and execute the calibration at the determined time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an example of a displayed setting guide image used for setting execution time of calibration;

DETAILED DESCRIPTION OF THE PREFERRED EMBODIMENTS

<First Embodiment>

A first embodiment of the present invention will be described in detail in accordance with the accompanying drawings.

[Configuration of a Printer System]

Figure 1:
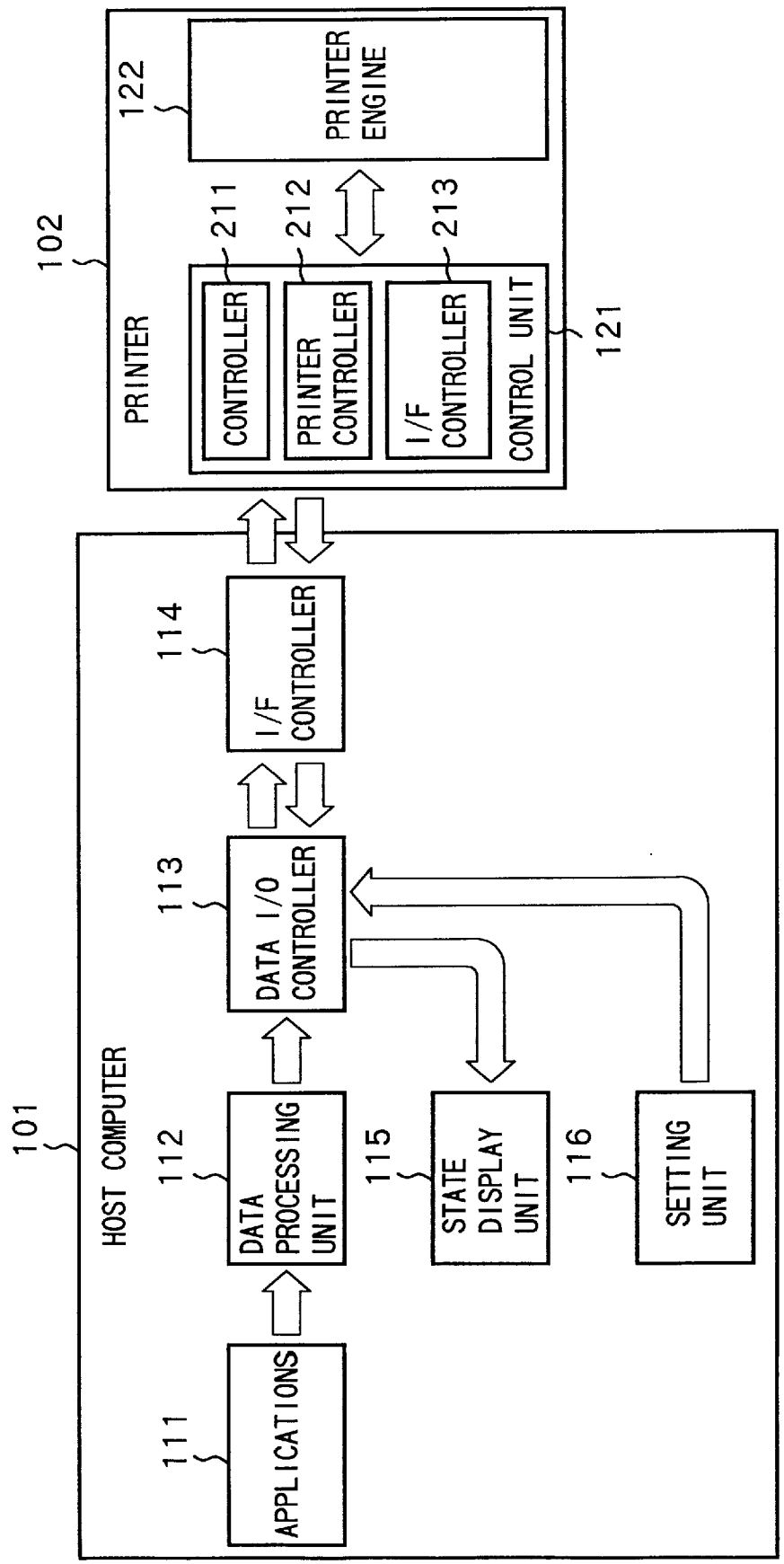
FIG. 1 is a block diagram illustrating a configuration of a host computer and a printer.

FIG. 1 is a block diagram illustrating a configuration of a host computer 101 and a printer 102 according to the first embodiment. The host computer 101 transmits print information including print data and control codes to the printer 102. Further, the host computer 101 is connected to the printer 102 via a bidirectional communication line, and obtains conditions of the printer 102 and a calibration request, for example, from the printer 102. The printer 102 includes a printer engine 122 having a printing mechanism for forming a desired visual image on a recording paper sheet, and a control unit 121 which includes a controller 211 for controlling the entire printing apparatus, a printer controller 212 for controlling the printing mechanism, and an interface (I/F) controller 213 for controlling interfacing with the host computer 101.

When calibration needs to be performed, the printer engine 122 sends a calibration request to the control unit 121. In turn, the control unit 121 transmits the request to the host computer 101.

Applications 111 are software for a user to generate desired data, and if an operating system of the host computer 101 is Windows™ operating system by Microsoft Corporation, the applications 111 include a graphic display interface (GDI), for example. The applications 111 function by being executed by a CPU (not shown) which controls the host computer 101.

A data processing unit 112 generates print data and control codes to be outputted from the printer 102 on the basis of data transmitted from the applications 111. A data input/output (I/O) controller 113 sends the print data and the control codes transmitted from the data processing unit 112 to an interface (I/F) controller 114. Further, the data I/O controller 113 analyzes information on conditions of the printer 102 inputted from the printer 102 via the I/F controller 114. When the input from the printer 102 is a calibration request, the data I/O controller 113 performs various controls depending upon the settings indicated by a user or a status of a printing job, and, if it is necessary to inform a user of the calibration request from the printer 102, the data I/O controller 113 sends data to be displayed on a state display unit 115. The I/F controller 114 controls the interface with the printer 102 and controls transmission of print information including print data and control codes to the printer 102 and reception of information from the printer 102.

The state display unit 115 displays data transmitted from the data I/O controller 113. A setting unit 116 is means for setting execution time of calibration.

[Configuration of the Host Computer]

Figure 7:
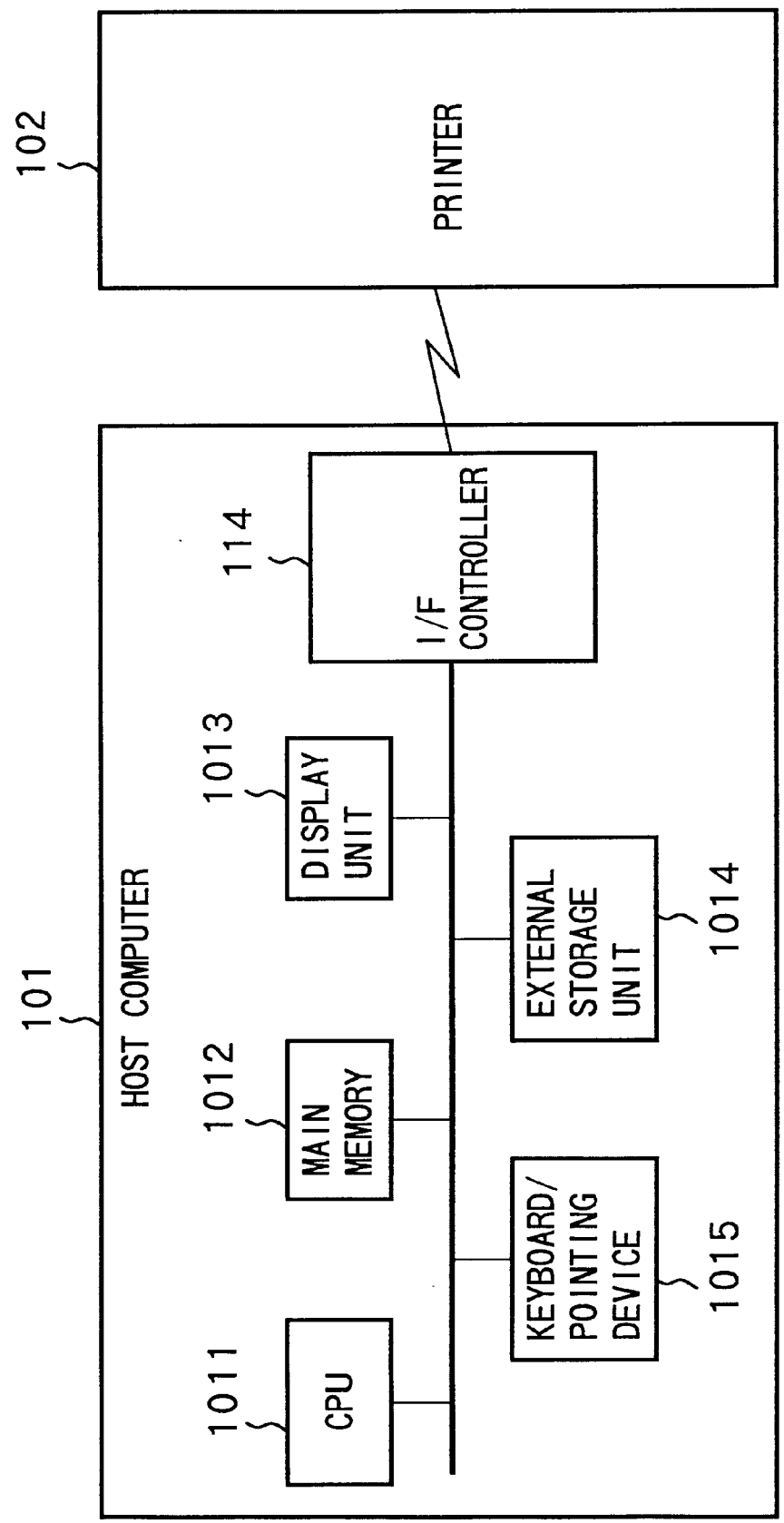
FIG. 7 is a block diagram illustrating a configuration of the host computer.

FIG. 1 shows a logical configuration of the host computer 101 expressed in a software viewpoint, and the physical configuration of the host computer 101 is as shown in FIG. 7. More specifically, a program stored in a main memory 1012 is executed by a CPU 1011, thereby performing the function of the application software. Processings which will be explained later with reference to flowcharts are also executed by the CPU 1011. Conditions, and the like, of the printer 102 and the host computer 101 are displayed on a display unit 1013. An operator performs, for example, settings of calibration which will be explained later, via a keyboard and a pointing device 1015. Further, programs, data, and so on, are stored in an external storage unit 1014 as files.

[Calibration]

Next, calibration which is performed in the printer 102 is explained in more detail.

Figure 8:
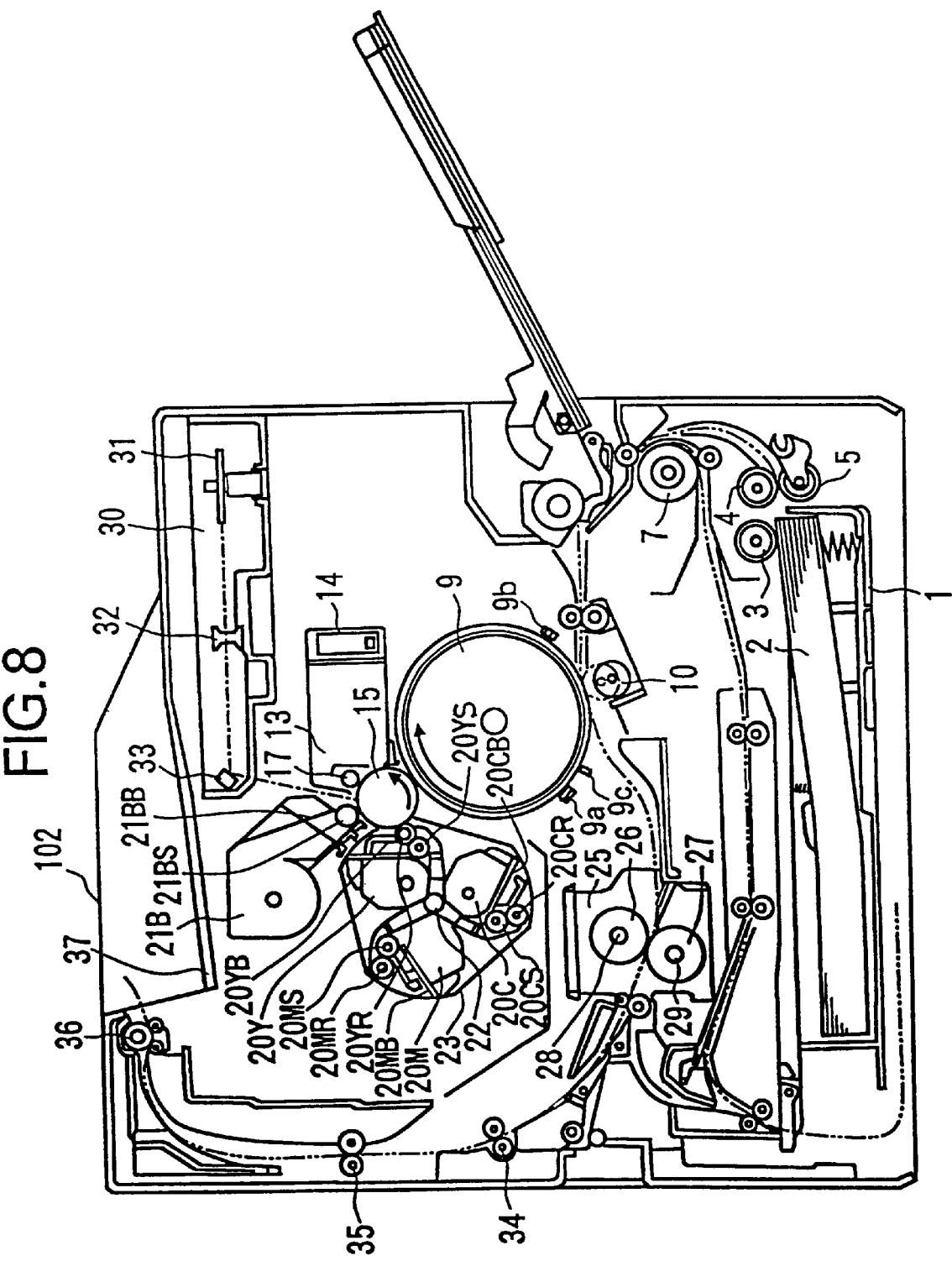
FIG. 8 is a cross sectional view of the printer.

FIG. 8 is a cross sectional view showing a brief configuration of the printer 102 adopting an electrophotographic method. The printer 102 of the first embodiment is a laser beam color printer. In this printer 102, a laser beam modulated on the basis of image data of each color component obtained from print data inputted from the host computer 101 scans an electrostatic drum 15 by using a scanner unit 30 including a polygon mirror 31, thereby forming a latent image. Then, the latent image is developed with toner to obtain a visual image. Visual images of all the color components obtained in the aforesaid manner are transferred onto an intermediate transfer body 9, thereby forming a color visual image. Then, the color visual image is transferred on a transfer medium 2, and fixed on it. An image forming unit which controls the aforesaid processing includes a drum unit 13 having the electrostatic drum 15, a primary charger having a contact charge roller 17, a cleaning unit, developing units, the intermediate transfer body 9, a paper feed unit including a paper feed cassette 1 and various rollers 3, 4, 5 and 7, a transfer unit including a transfer roller 10, and a fixing unit 25.

The electrostatic drum (electrostatic body) 15 and a cleaner container 14, having a cleaning mechanism, which functions as a holder of the electrostatic drum 15 are integrally configured to form the drum unit 13. The drum unit 13 is supported so as to be detachable from a main body of the printer 102 so that it can be easily exchanged when the life time of the electrostatic drum 15 has passed. The electrostatic drum 15 is configured with an aluminum cylinder whose periphery is covered with an organic photoconductor layer, and is rotatably supported by the cleaner container 14. The electrostatic drum 15 is rotated by a driving motor (not shown), and the driving motor makes the electrostatic drum 15 rotate in the counter-clockwise direction as the image forming operation proceeds. The surface of the electrostatic drum 15 is selectively exposed by the laser beam from the scanner unit 30, thereby forming a latent image. In the scanner unit 30, a modulated laser beam is reflected by the polygon mirror 31 which rotates in synchronization with a horizontal synchronizing signal, and is focused on the electrostatic drum 15 via a lens 32 and a mirror 33.

The developing units include three color developing units 20Y, 20M and 20C for developing latent images in yellow (Y), magenta (M) and cyan (C), respectively, and a black developing unit 21B for developing a latent image in black (B). Sleeves 20YS, 2OMS, 20CS and 21BS and applying blades 20YB, 20MB, 20CB and 21BB which press against the peripheral surfaces of the sleeves 20YS, 20MS, 20CS and 21BS are provided to the color developing units 20Y, 20M and 20C and the black developing unit 21B, respectively. Further, applying rollers 20YR, 20MR and 20CR are also provided to the three color developing units 20Y, 20M and 20C, respectively.

Further, the black developing unit 21B is installed in the main body of the printer 102 so as to be detachable, and the color developing units 20Y, 20M and 20C are installed in a developer rotary 23 which rotates about a rotation axis 22 so as to be detachable.

The sleeve 21BS of the black developing unit 21B is installed near the electrostatic drum 15 at a very small distance of, e.g., 300 μm. In the black developing unit 21B, toner is charged by friction as it is conveyed by a built-in conveying member, so that the toner is applied on the peripheral of the sleeve 21BS, rotating in the clockwise direction, by the applying blade 21BB. Further, by applying a developing bias voltage to the sleeve 21BS, a latent image on the electrostatic drum 15 is developed, thereby forming a visual image with black toner on the electrostatic drum 15.

The three color developing units 20Y, 20M and 20C rotate in accordance with the rotation of the developer rotary 23 when forming an image, and a predetermined sleeve 20YS, 20MS or 20CS faces to the electrostatic drum 15 at a very small distance of 300 μm, for example. Accordingly, the predetermined color developing unit 20Y, 20M or 20C stops at a developing position facing to the electrostatic drum 15, thereby a visual image is formed on the electrostatic drum 15.

When forming a color image, the developer rotary 23 rotates in response to each rotation of the intermediate transfer body 9, and images are sequentially developed by the yellow developing unit 20Y, the magenta developing unit 20M, the cyan developing unit 20C, and then the black developing unit 21B. Therefore, in four rotations of the intermediate transfer body 9, visual images of yellow, magenta, cyan and black toner are sequentially formed, and, as a result, a full-color visual image is formed on the intermediate transfer body 9.

The intermediate transfer body 9 is in contact with the electrostatic drum 15 so as to rotate together with the rotation of the electrostatic drum 15. Therefore, the intermediate transfer body 9 rotates in the clockwise direction when forming a color image, and four visual images developed by toner of four color component are sequentially transferred overlapped to the intermediate transfer body 9 from the electrostatic drum 15. Further, the intermediate transfer body 9 transfers the color visual image formed on it to the transfer medium 2 conveyed by the transfer roller 10, which will be explained later, so as to be in contact with the intermediate transfer body 9. Around the intermediate transfer body 9, a TOP sensor 9a and an RS sensor 9b, which will be explained later with reference to FIG. 10, for detecting predetermined positions on the intermediate transfer body 9, and a density sensor 9c, which will be also explained later with reference to FIG. 10, for detecting the density of the toner image transferred on the intermediate transfer body 9 are provided.

The transfer roller 10 has a transfer charger supported so as to be detachable and in contact with or separated from the electrostatic drum 15, and is configured with a metal rod wound with a medium resistance foam elastic body.

The transfer roller 10 is at a position separated from the intermediate transfer body 9, as shown by a solid line in FIG. 8, while visual images of each color are transferred onto the intermediate transfer body 9 so as not to disturb a color visual image on the intermediate transfer body 9. Then, after the color visual image in four colors is formed on the intermediate transfer body 9, the transfer roller 10 is moved upward to a position, shown by a broken line in FIG. 8, by a cam member (not shown) in synchronization with a time for transferring the color visual image onto the transfer medium 2. Accordingly, the transfer roller 10 is brought in contact with the intermediate transfer body 9 via the transfer medium 2 upon application of a predetermined pressure. At the same time, a bias voltage is applied to the transfer roller 10, thereby the color visual image on the intermediate transfer body 9 is transferred onto the transfer medium 2.

The fixing unit 25 is for fixing the color visual image on the transfer medium 2 while conveying it, and has a fixing roller 26 for heating the transfer medium 2 and a pressing roller 27 for pressing the transfer medium 2 against the fixing roller 26 as shown in FIG. 8. The fixing roller 26 and the pressing roller 27 have hollows inside, and heaters 28 and 29 are installed there, respectively. Thereby, as the transfer medium 2 holding the color visual image is conveyed by the fixing roller 26 and the pressing roller 27, toner is fixed on the surface of the transfer medium 2 by heat and pressure.

The transfer medium 2 on which the visual image is fixed is discharged to a paper discharge unit 37 by paper discharging rollers 34 to 36, thereby completing the image forming process.

Cleaning means are provided for cleaning residual toner on the electrostatic drum 15 and the intermediate transfer body 9. Toner waste remaining on the electrostatic drum 15 after transferring a visual toner image onto the intermediate transfer body 9 and toner waste remaining on the intermediate transfer body 9 after transferring a color visual image of four colors onto the transfer medium 2 are stored in the cleaner container 14.

Figure 9:
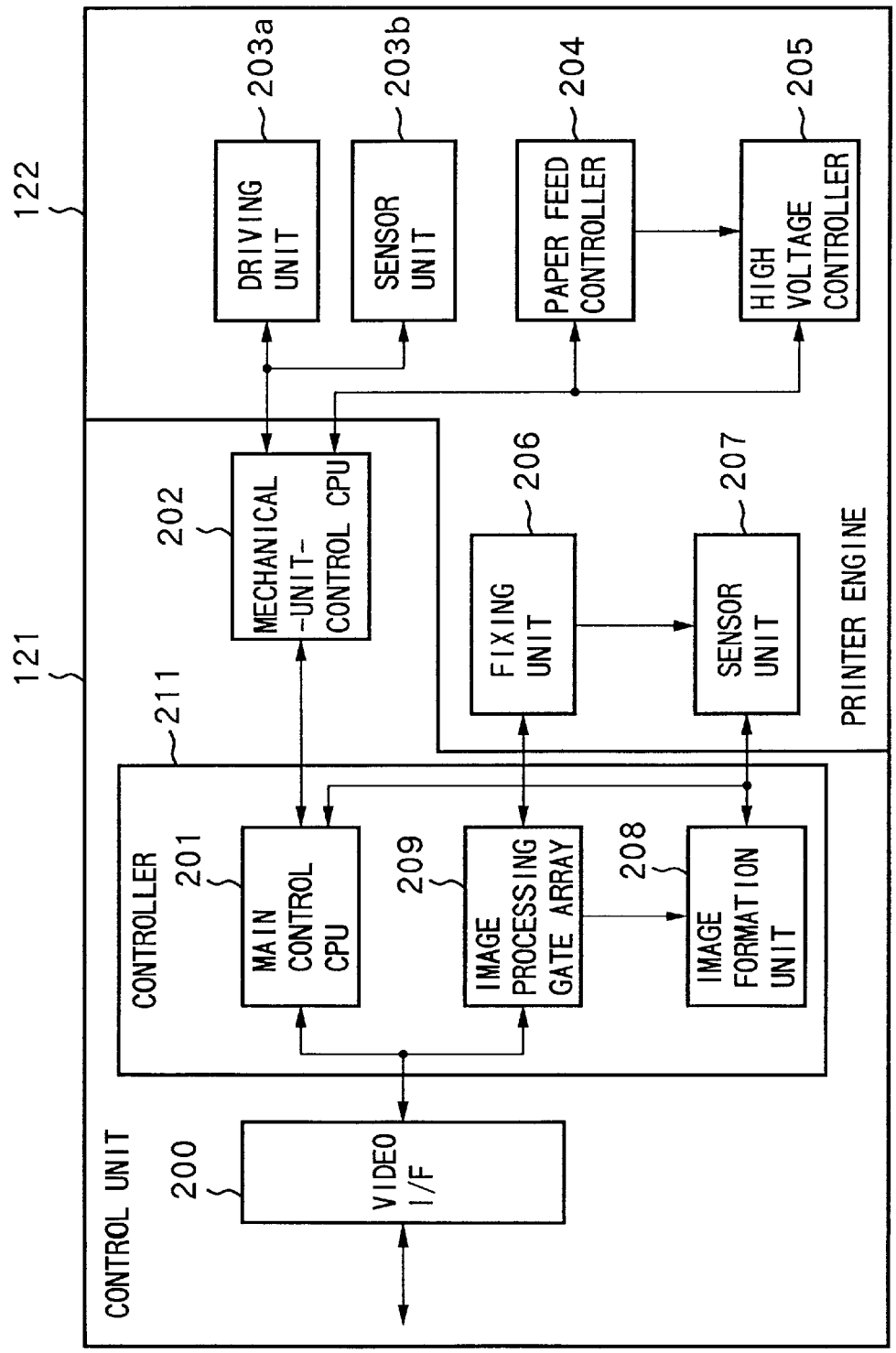
FIG. 9 is a block diagram illustrating a control configuration of a printer.

FIG. 9 is a block diagram illustrating a control configuration of the printer 102 shown in FIG. 8. The printer 102 is roughly divided into the control unit 121 and the printer engine 122. In the control unit 121, reference numeral 200 denotes a video interface (I/F) for interfacing with the host computer 101 which controls the printer 102. The video I/F 200 corresponds to the I/F controller 213 in FIG. 1. The controller 211 includes an image processing gate array 209 for applying processes, such as γ correction, to image data received through the video I/F 200, an image formation unit 208 for outputting an image by controlling, e.g., a laser and a scanner motor, and a main control CPU 201 for controlling each of the above units as well as controlling a mechanical-unit-control CPU 202 as a sub-CPU. The mechanical-unit-control CPU 202 controls a driving unit 203a such as a motor, a clutch and a fan, a sensor unit 203b for detecting positions of a recording medium, a paper feed controller 204 for controlling supply of a recording paper sheet, and a high voltage controller 205. The mechanical-unit-control CPU 202 corresponds to the printer controller 212.

Further, the printer engine 122 includes the driving unit 203a, such as a motor, the sensor unit 203b w for detecting a position of a recording medium, a fixing unit 206, a sensor unit 207, such as a temperature humidity sensor and a sensor for detecting the remaining amount of toner, the paper feed controller 204, and the high voltage controller 205 used for charging.

Figure 10:
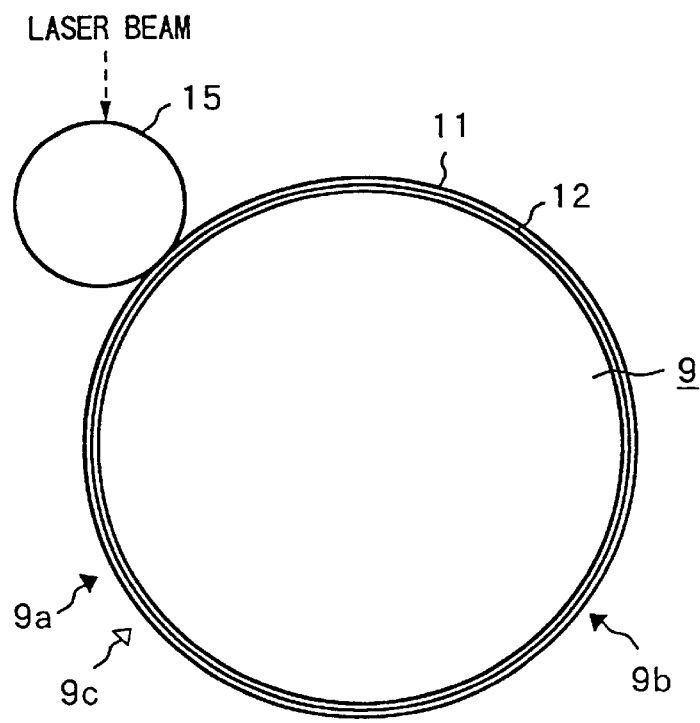
FIG. 10 is a view showing an arrangement of an intermediate transfer body and sensors.

FIG. 10 is a view showing an arrangement of an intermediate transfer body 9 and sensors. The intermediate transfer body 9 is configured with an aluminum cylinder 12 whose peripheral surface is covered with an elastic layer 11, such as a medium resistance sponge and a medium resistance rubber. Further, around the intermediate transfer body 9, the TOP sensor 9a for detecting start position of image formation, the RS sensor 9b for detecting start time for feeding paper, and the density sensor 9c.

The density sensor 9c is used for density control, namely calibration, so as to print an image in correct colors. More specifically, the density sensor 9c detects density of a developer image formed on the intermediate transfer body 9 as a test image for density detection of each color. Then, the detected density is fed back to adjust image forming conditions, such as luminous exposure and a developing bias voltage, thereby density control for forming an image in colors of an original image is performed. Accordingly, images of steady quality are obtained. As described in Japanese Patent Application No. 7-92385, there are two types of density control methods; one is DMAX control and the other is half-tone control. In the DMAX control, with fixed luminous exposure, a test developer image is formed while altering a developing bias voltage. The density of the developer image is measured, and a developing bias voltage value corresponding to reference density of each color is calculated. In the half-tone control, with a fixed developing bias voltage a test developing image is formed while altering luminous exposure in several levels by a controller. The density of the developer image is measured, and the obtained result is fed back to the controller. Then, the controller generates a γ table on the basis of the measured result.

Times for initiating density control would be when power is turned on (while waiting until the fixing unit reaches a predetermined temperature), when the developing unit is changed, when the electrostatic drum cartridge is changed, when the intermediate transfer body is changed, when environmental conditions are noticeably changed from those when the density control is performed previously, and when a predetermined number of pages has been printed.

Figure 11:
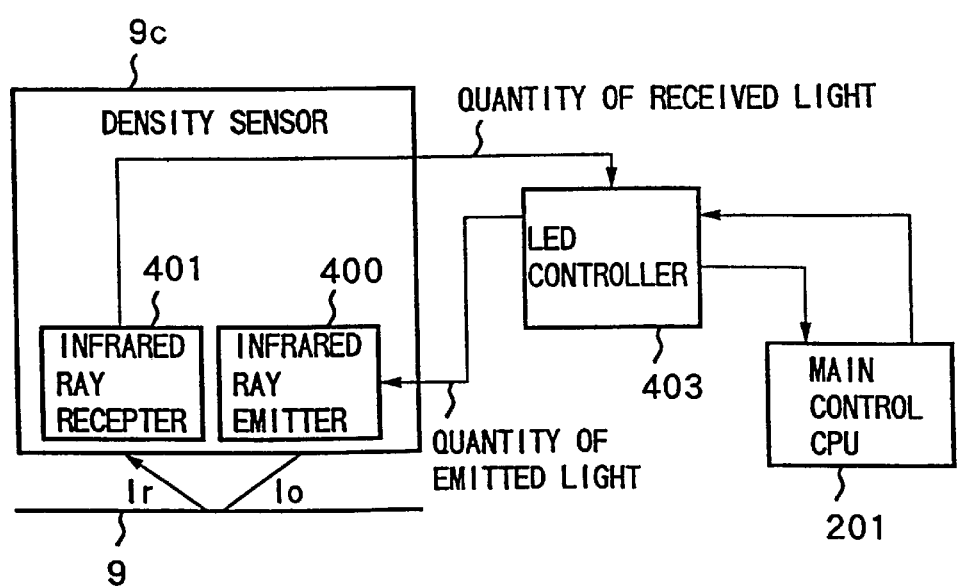
FIG. 11 is a block diagram illustrating a control configuration of a unit for detecting density of an image formed on the intermediate transfer body of the printer.

FIG. 11 is a block diagram illustrating a configuration of a control unit for detecting density of an image (calibration) by using the density sensor 9c, and the control unit is included in the sensor unit 207. The density sensor 9c is configured with an infrared ray emitter 400 and an infrared ray receptor 401. An infrared ray Io emitted form the infrared ray emitter 400 is reflected by the surface of the intermediate transfer body 9, and the quantity of light of the reflected ray Ir is detected by the infrared ray receptor 401. The reflected ray Ir whose quantity of light is detected by the infrared ray receptor 401 is monitored by an LED controller 403, and a signal representing the quantity of light of the reflected ray Ir is transmitted to the main control CPU 201. The main control CPU 201 calculates the density on the basis of the detected value of the emitted infrared ray Io and the reflected ray Ir, and controls a developing bias voltage.

With the aforesaid configuration, the printer 102 performs calibration of density at a predetermined time.

[Calibration Control]

FIG. 2 is an example of a displayed setting guide image used for setting the execution time of calibration by the setting unit 116 of the host computer 101. The time is set by selecting from choices, "execute immediately", "execute after completing job", "automatic" and "execute depending upon the number of remaining pages". When the choice "execute depending upon the number of remaining pages" is selected, the reference number of pages which determines execution time is also set. When the choice "execute depending upon the number of remaining pages" is set, the host computer 101 checks the number of remaining pages of the printing job which is in progress when a calibration request is received, and when the number of remaining pages registered in the host computer is equal to or greater than the reference number of pages, calibration is performed. When the choice "automatic" is selected, execution time of calibration is determined depending upon the characteristics of a printing job or the number of remaining pages, as discussed below.

Figure 3:
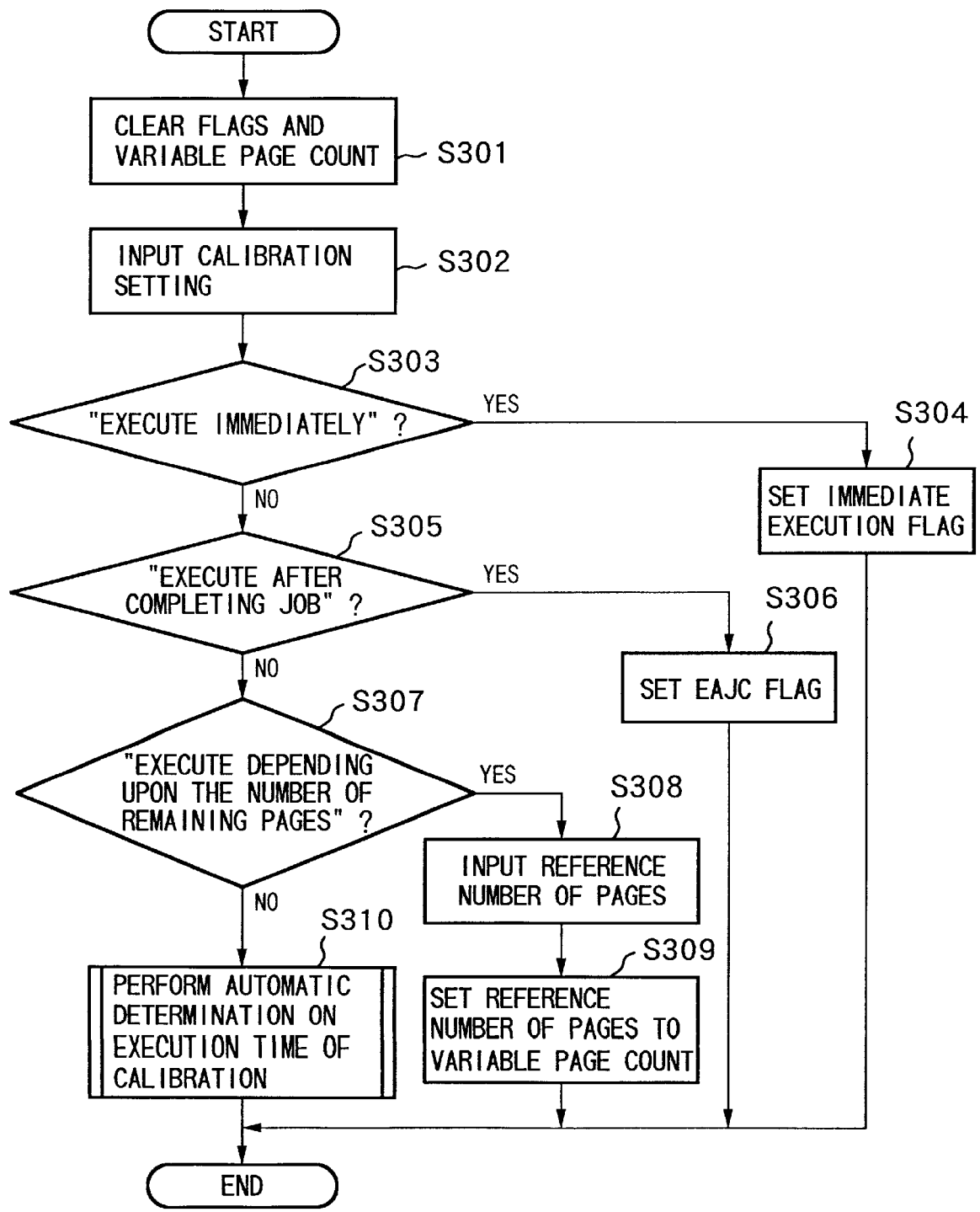
FIG. 3 is a flowchart showing an algorithm for determining execution time of calibration according to a first embodiment.

FIG. 3 is a flowchart showing an algorithm for determining execution time of calibration on the basis of the content selected on the setting screen shown in FIG. 2. Depending upon the selected contents, flags and a variable page-count are set. The flags and the variable page-count are used for determining the execution time of calibration when a calibration request is received. The details of processing for determining execution time of calibration will be explained with reference to the flowchart in FIG. 3.

In step S301, the flags and counter are all cleared. The flags and count used for determining execution time of calibration are an "immediate execution flag", an "execute-after-job-completion (EAJC) flag", and the variable page-count. The variable page-count is a variable to be compared with the number of remaining pages of a printing job which is in progress when the choice "execute depending upon the number of remaining pages" is selected as execution time of calibration.

At step S302, the setting of the calibration inputted in accordance with the displayed contents shown in FIG. 2 is read. At step S303, whether or not the choice "execute immediately" is selected is checked, and if it is, the process proceeds to step S304 where the immediate execution flag is set and the processing is completed. If the choice "execute immediately" is not selected, the process moves to step S305 where whether or not the choice "execute after completing job" is selected is checked. If it is, the process proceeds to step S306 where the EAJC flag is set and the processing is completed. If the choice "execute after completing job" is not selected, the process proceeds to step S307 where whether or not the choice "execute depending upon the number of remaining pages" is selected is determined. If it is, then a reference number of pages is inputted at step S308, the reference number of pages is set to the variable page-count at step S309, and the processing is completed. If the choice "execute depending upon the number of remaining pages" is not selected, processes for determining execution time of calibration when the choice "automatic" is selected is performed at step S310, and the processing shown in FIG. 3 is completed.

Figure 4:
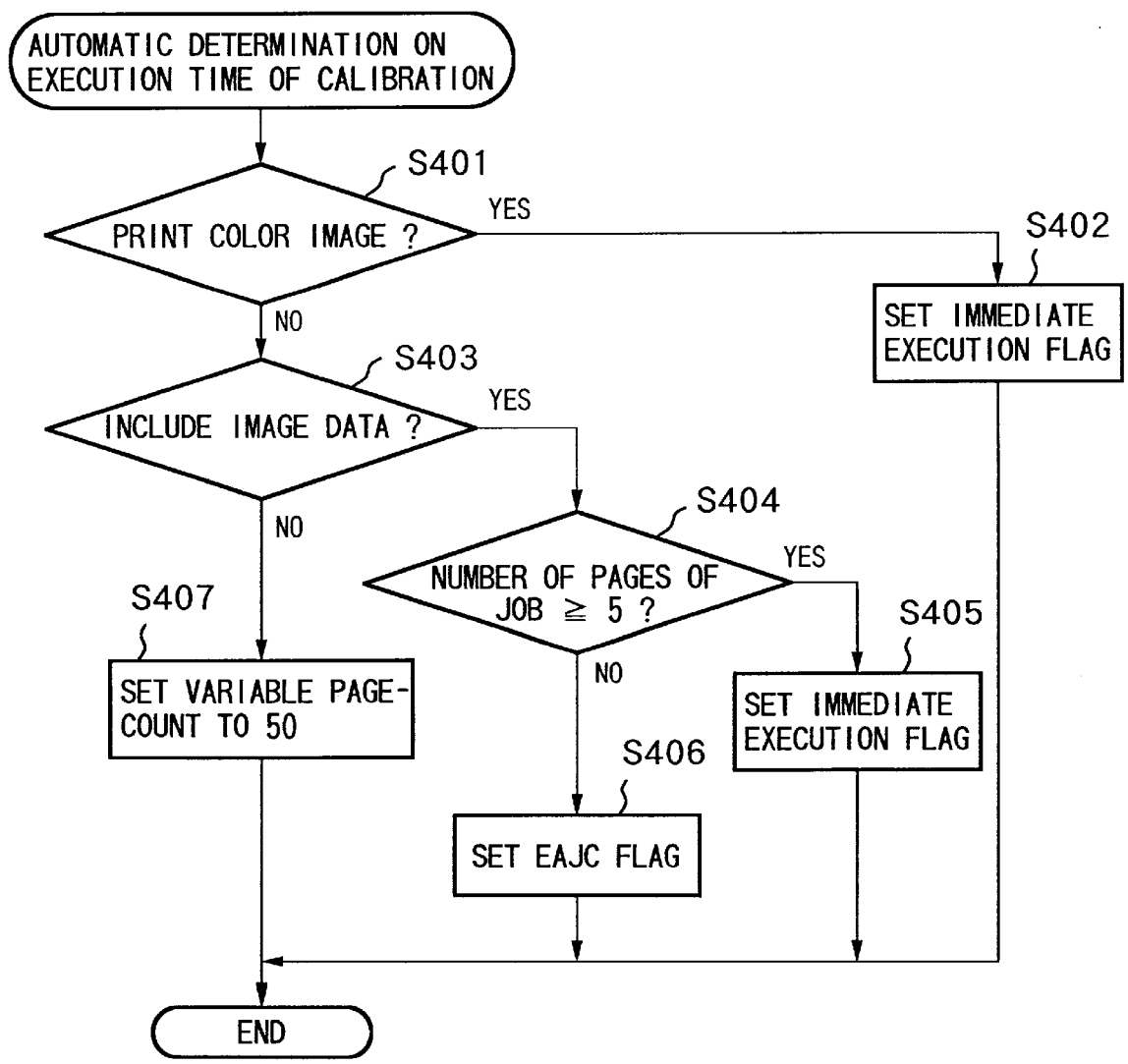
FIG. 4 is a flowchart showing an algorithm for determining execution time of calibration when the choice "automatic" is selected in the first embodiment.

FIG. 4 is a flowchart showing an algorithm for determining execution time of calibration at step S310, performed in the host computer 101, when the choice "automatic" is selected. Characteristics and the number of pages of a printing job which is to be transmitted from the host computer 101 to the printer 102 are determined, and depending upon the determined result, execution time is determined either to immediate execution, execution after completing job, or execution depending upon the number of remaining pages. Details of the processing will be explained below with reference to the flowchart in FIG. 4.

In step S401, whether the printing job is to print a color image or to print a monochromatic image is determined. If a color image is to be printed, the immediate execution flag is set at step S402, and if a monochromatic image is to be printed, the process moves to step S403. The reason for setting the immediate execution flag in step S402 is that, when the printing job is to print a color image, it is considered that a very high print quality is required. The determination of whether the printing job is to print a color image or to print a monochromatic image is performed by obtaining the contents of a setting set by a user by the data processing unit 112, for example. It is also possible to determine whether the printing job is to print a color image or to print a monochromatic image by distinguishing data when processing it in the data processing unit 112.

In step S403, whether the printing job to be processed includes image data or not is determined, and if it does, the process proceeds to step S404, whereas if it does not, the process proceeds to step S407. Determination of whether or not the printing job includes image data is performed by obtaining the contents of a setting set by a user by the data processing unit 112. The determination may be also performed by distinguishing the data when processing it in the data processing unit 112, or by obtaining the type of application program used for generating the printing job.

In a case where the printing job to be processed includes image data, whether or not the printing job has equal or more than 5 pages is determined, and if it is, the process proceeds to step S405 where the immediate execution flag is set. If it is not, the process moves to step S406 where the EAJC flag is set.

The reason for setting the immediate execution flag in step S405 is that, in a case where the printing job includes image data, it is considered that relatively high print quality is required, and the number of pages to be printed is relatively large. In such case, therefore, it is preferred to execute calibration immediately after a calibration request is received.

The reason for setting the EAJC flag in step S406 is that, although it is considered that relatively high print quality is required since the printing job includes image data, the number of pages to be printed is small. In such case, it is preferred to execute calibration after completing the printing job. The number of pages of the printing job is checked by inquiring a basic system, such as an operating system, on which the printing system of the first embodiment operates. It is also possible to obtain the number of pages by distinguishing data of the printing job when processing it by the data processing unit 112. In a case where the printing job does not include image data, the variable page-count is set to 50 at step S407 and the processing is completed.

If the printing job is to print a monochromatic image and does not include image data, it is considered that the required print quality is not so high. Therefore, even in a case where calibration is requested before such the printing job is finished, it is basically considered better to wait to perform calibration until the printing job is completed. However, if the execution time of calibration is set to perform always after completing such a printing job, in a case where the number of remaining pages of the printing job is large, the number of pages printed before executing calibration is large, and it takes considerably long before initiating calibration after the calibration is requested. Therefore, by setting a predetermined number to the variable page-count, the execution time of calibration is determined depending upon the contents of the printing job when the calibration request is received. The above is the reason for setting a predetermined number to the variable page-count in step S407.

According to the above procedure, calibration is immediately executed when the immediate execution flag is set, performed after a printing job is completed when the EAJC flag is set, and, when a predetermined value is set to the variable page-count, performed immediately if the number of pages to be printed is equal to or greater than the predetermined value.

Figure 5:
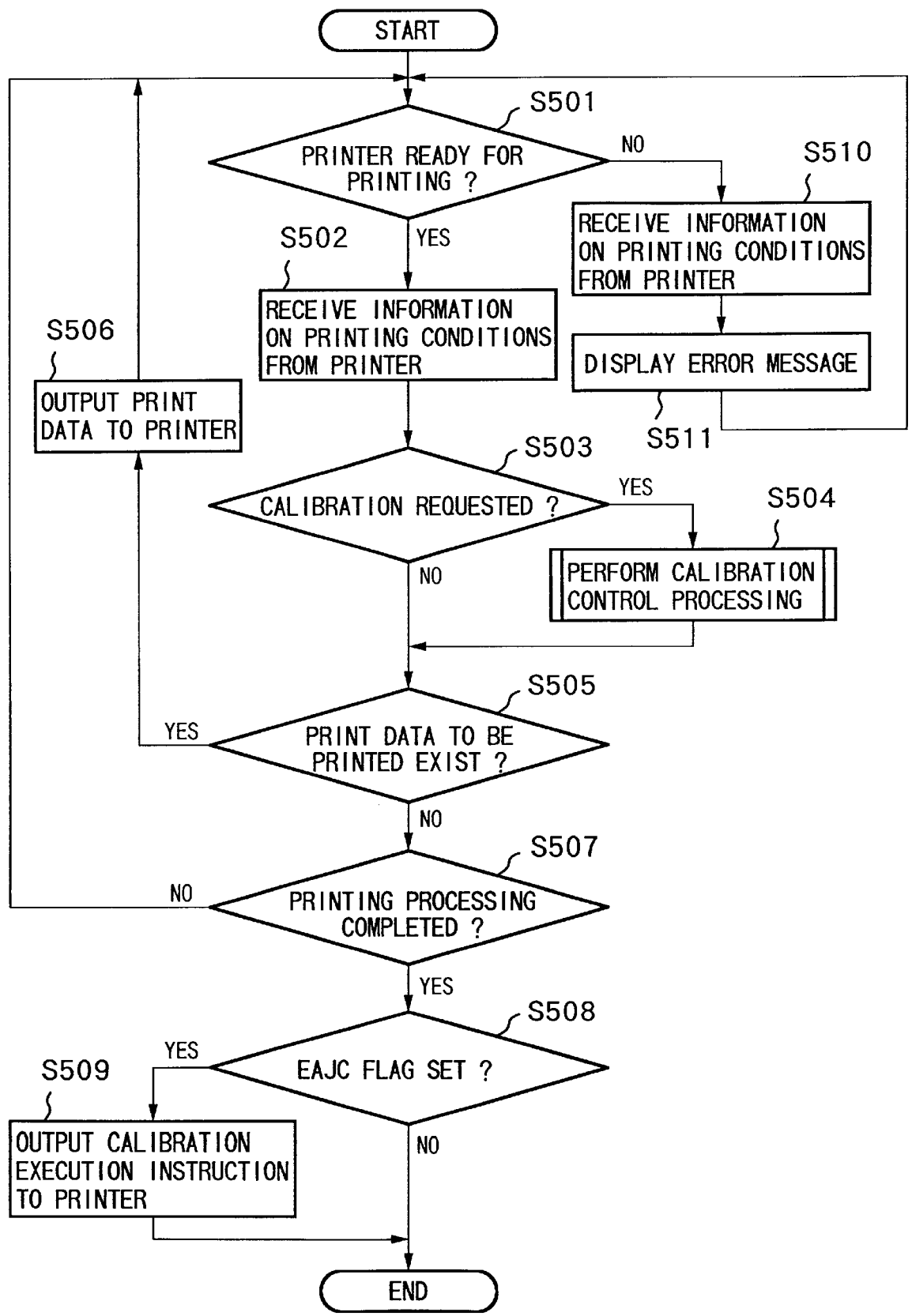
FIG. 5 is a flowchart showing an algorithm for controlling the printer by the host computer.

FIG. 5 is a flowchart showing an algorithm of processing for the host computer 101 when outputting print data and control data to the printer 102, and when receiving a calibration request or other state data from the printer 102. When the host computer 101 receives a calibration request from the printer 102, it controls execution of calibration on the basis of the immediate execution flag, the EAJC flag, or the variable page-count. Details of the processing are explained below with reference to the flowchart shown in FIG. 5.

In step S501, whether the printer 102 is ready for printing or not is determined. If it is, the process proceeds to step S502, whereas if it is not, the process moves to step S510.

In step S502, the host computer 101 receives information on the condition of the printer 102, and in step S503, whether a calibration request is issued or not is determined on the basis of the transmitted condition information. If there is a calibration request, calibration control processing (will be explained later in detail) is performed in step S504 and the process proceeds to step S505. In step S505, whether or not there is data to be outputted is determined. If there is, the print data is outputted to the printer 102 in step S506, thereafter, the process returns to step S501.

Whereas, if there is no data to be outputted, whether or not printing processing is completed or not is checked in step S507. If it is not, the process returns to step S501, whereas if it is, the process moves to step S508. In step S508, whether or not the EAJC flag is set is determined. If it is not, the process is completed, whereas, if it is, a calibration execution instruction is outputted to the printer 102 in step S509, then the process is completed.

Further, if the printer 102 is not ready for printing in step S501, information on printing conditions is inputted from the printer 102 to the host computer 101, an error message is displayed on the basis of the information on printing conditions in step S511, and the process returns to step S501.

Figure 6:
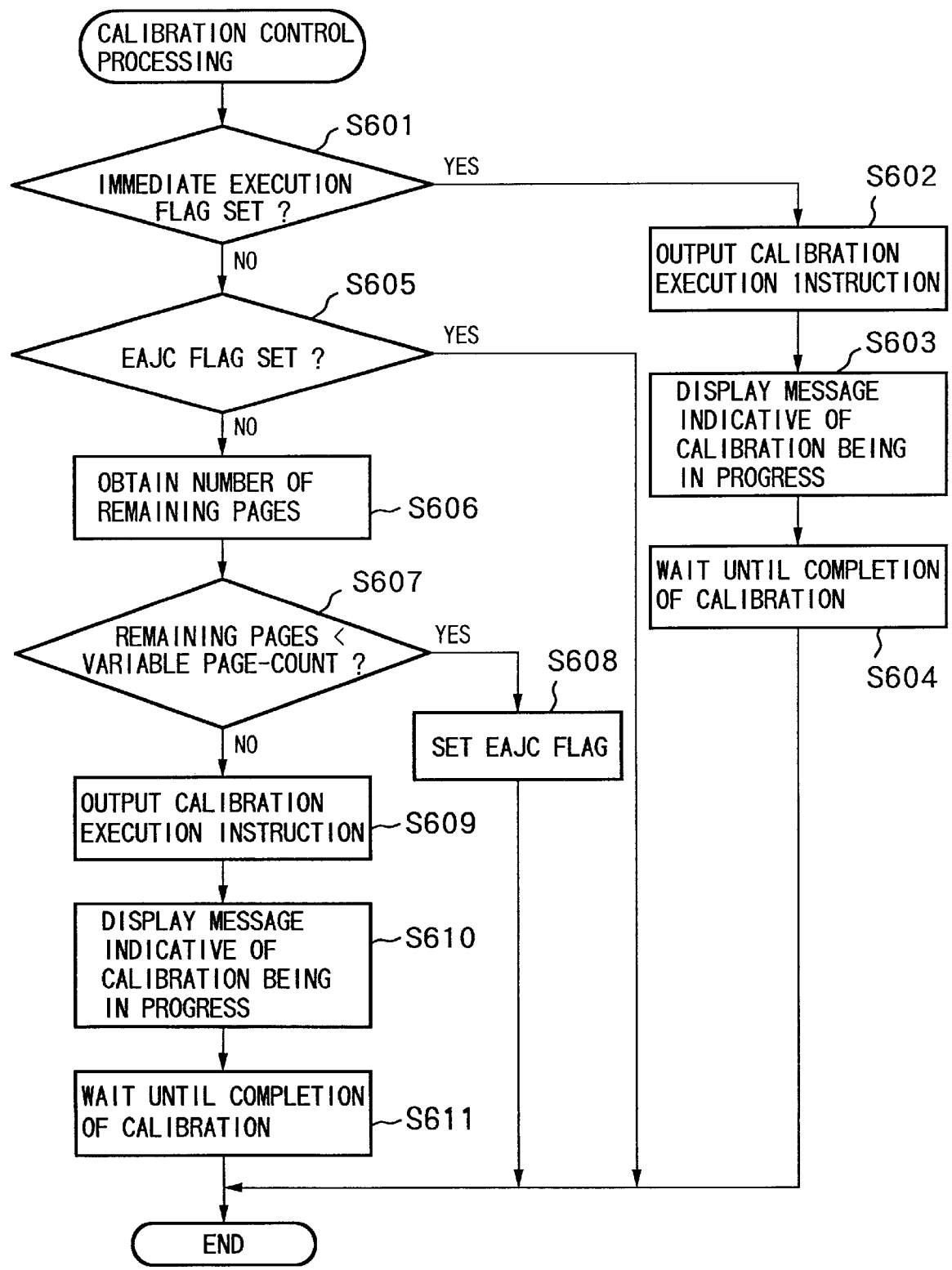
FIG. 6 is a flowchart showing an algorithm of calibration control processing according to the first embodiment.

FIG. 6 is a flowchart showing an algorithm of calibration control processing performed in step S504. When the host computer 101 receives a calibration request from the printer 102, it controls execution of calibration on the basis of the flags and count. Details of the processing will be explained below with reference to the flowchart in FIG. 6.

In step S601, whether the immediate execution flag is set or not is determined. If it is, the host computer 101 outputs a calibration execution instruction to the printer 102 in step S602 and displays a message indicating that the calibration is in progress in step S603. Then in step S604, the process waits until the host computer 101 receives notification indicating completion of calibration from the printer 102, and the processing is completed.

If it is determined that the immediate execution flag is not set in step S601, then whether the EAJC flag is set or not is determined in step S605. If it is, the processing is completed, whereas if it is not, the process moves to step S606.

In step S606, the number of remaining pages of the printing job which is currently undergoing is obtained. In step S607, the obtained number of remaining pages and the variable page-count are compared. If the variable page-count is larger than the obtained number of remaining pages, then the process proceeds to step S608 where the EAJC flag is set and the processing is completed.

Whereas, if the obtained number of remaining pages is equal or larger than the variable page-count, then the host computer 101 issues a calibration execution instruction to the printer 102 in step S609 and displays a message indicating that calibration is in progress in step S610. After the process waits until a notification of completion of calibration is inputted from the printer 102 in step S611, then the processing is completed.

The number of remaining pages of the printing job currently undergoing is obtained by inquiring the host computer 101. It is also possible to obtain the number of remaining pages by distinguishing data from the printer 102 when controlling data of the printing job by the data I/O controller 113.

As described above, it is possible to determine the execution time of calibration in accordance with an instruction by an operator or by program control. Therefore, when an urgent printing job is to be performed, the execution of calibration is postponed until the printing job is completed even when calibration is requested. In addition, in a case where it is preferred to perform calibration before initiating a printing job, calibration is performed before initiating the printing job, whereas if there is no preference about execution time of calibration, it is possible to complete a printing job first.

<Second Embodiment>

In the first embodiment, when the choice "automatic" is set for determining execution time of calibration, the execution time of calibration is determined in advance depending upon whether the printing job currently ongoing is to print a color image or to print a monochromatic image, whether or not the printing job includes image data, and the number of pages. However, it is possible to use other methods for determining the execution time of calibration when a calibration request is received. In this case, the configurations of the apparatuses are the same as those explained in the first embodiment, and processing sequence is almost the same as that explained in the first embodiment. However, the processing for setting execution time of calibration shown in FIG. 3, the calibration control processing shown in FIG. 6, and the sequence of automatic determination on execution time of calibration in FIG. 4 are different. The following explanation is mainly about the differences.

Figure 12:
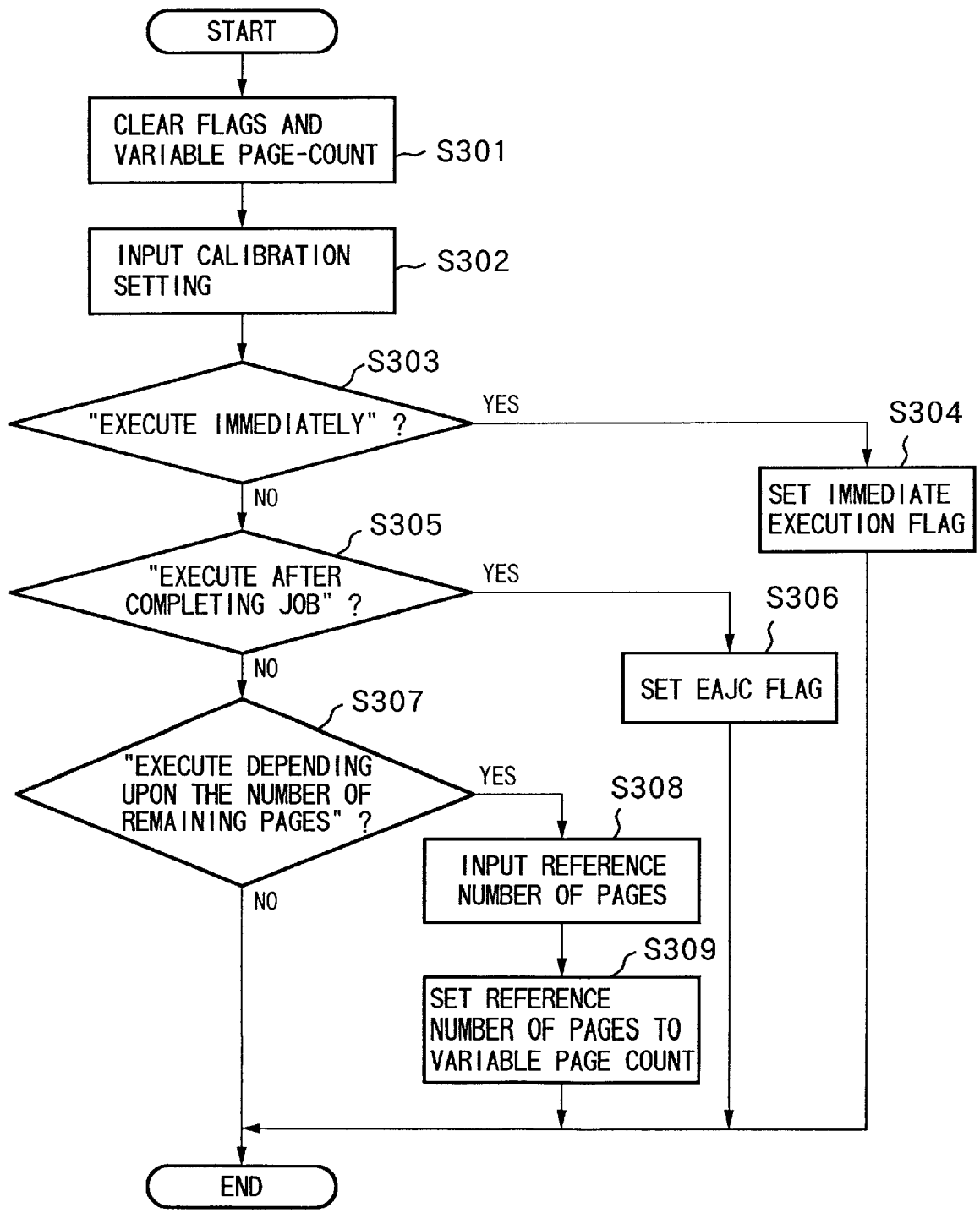
FIG. 12 is a flowchart showing an algorithm for determining execution time of calibration according to a second embodiment of the present invention.

FIG. 12 is a flowchart showing an algorithm for determining execution time of calibration on the basis of the content selected on the setting guide screen shown in FIG. 2. Differing from FIG. 3, in a case where the choice "automatic" is selected, automatic determination on execution time of calibration is not performed at this point. The other processes are the same as those explained in the first embodiment. Therefore, when the choice "automatic" is set, the flags and count remain 0 which is set in step S301.

In a case where the host computer 101 outputs print data and control data to the printer 102, and a case where the host computer 101 receives a calibration request and other information on printing conditions from the printer 102, the processing shown in FIG. 5 is performed as in the first embodiment.

Figure 13:
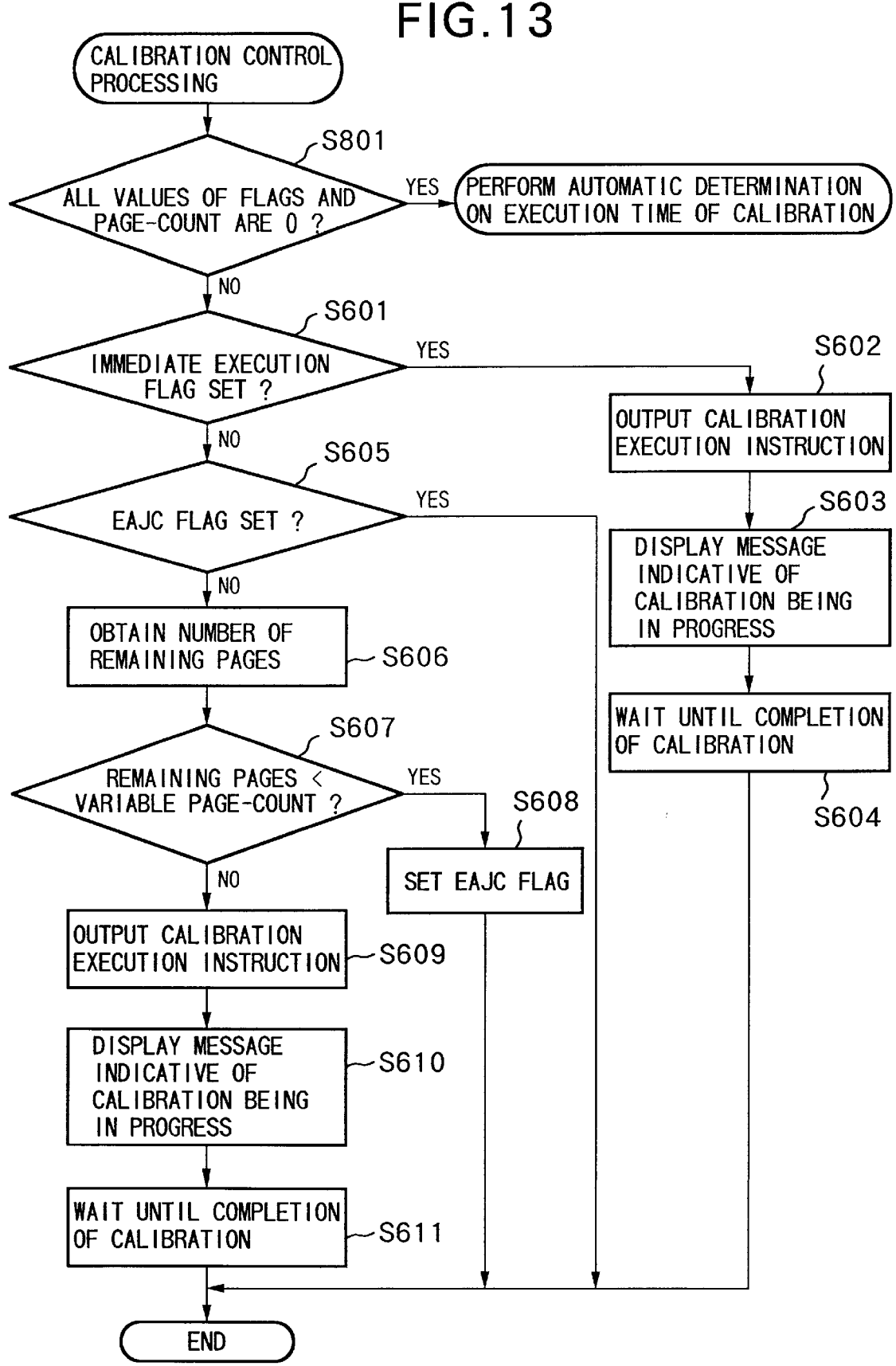
FIG. 13 is a flowchart showing an algorithm of calibration control processing according to the second embodiment.

FIG. 13 is a processing sequence when a calibration request is received by the host computer 101. In FIG. 13, the processes which are the same as those shown in FIG. 6 are referred by the same reference numerals. In order to dynamically perform automatic setting, first in step S801, values of the flags and counter are checked, and whether or not all the values are 0 is tested. If they are all 0, then it is determined that the choice "automatic" is selected, and the process branches into processing of "automatic determination on execution time of calibration". Otherwise, processes the same as those in FIG. 6 are performed on the basis of the set values of the flags and count.

Figure 14:
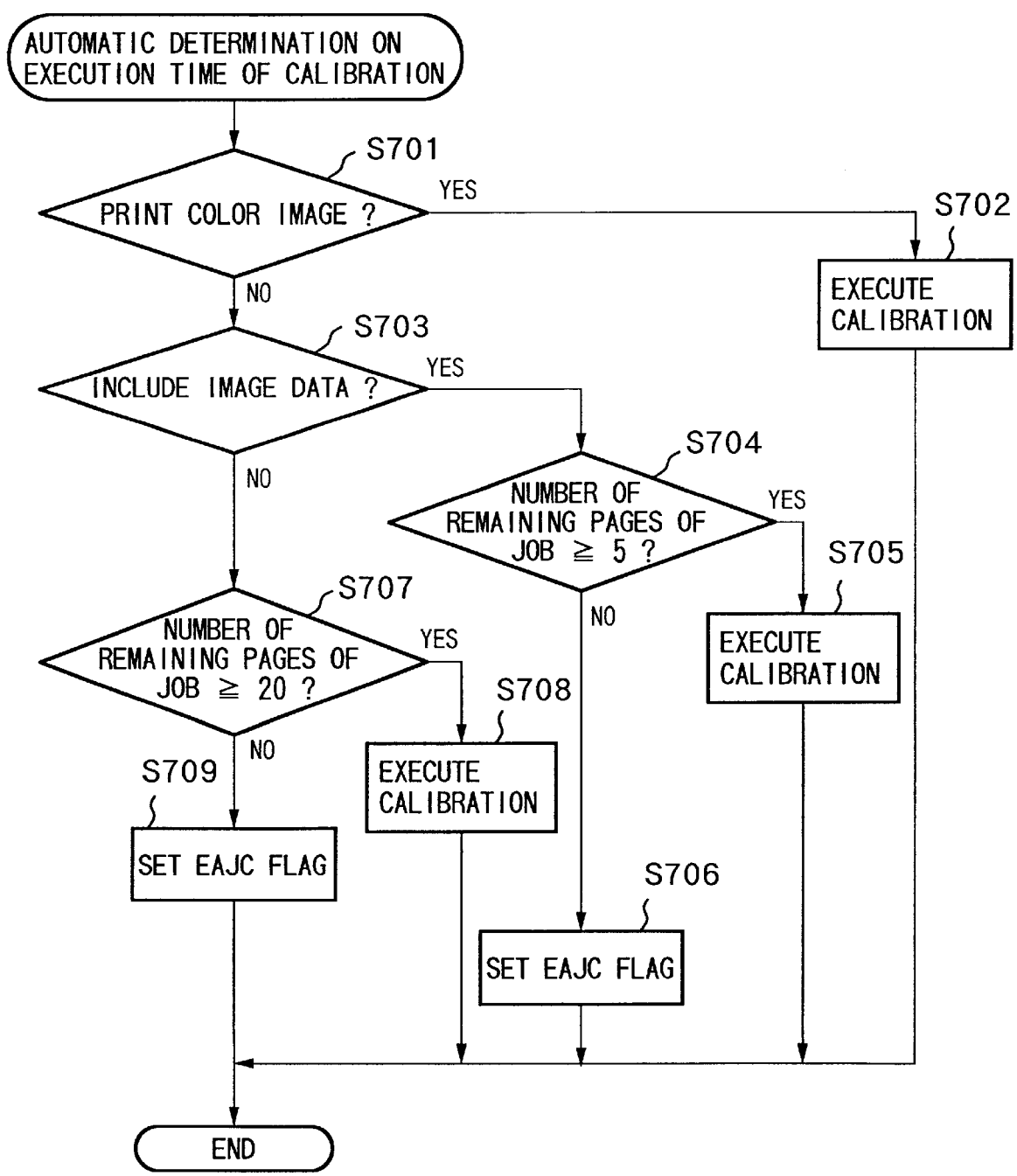
FIG. 14 is a flowchart showing an algorithm for determining execution time of calibration when a calibration request is received in a case where the choice "automatic" is selected according to the second embodiment.

FIG. 14 is a flowchart showing an algorithm for determining execution time of calibration when a calibration request is received in a case where the choice "automatic" is selected in FIG. 2. Differences between the processing shown in FIG. 14 and shown in FIG. 4 in the first embodiment is that the EAJC flag is the only flag set, and, when the EAJC flag is not set, calibration is directly executed without setting the immediate execution flag. This is because execution time of calibration is not determined in advance, and calibration is controlled when calibration is requested in accordance with the state of a printing job at the time. Details of processing will be explained below with reference to FIG. 14.

In step S701, whether the printing job which is in progress is to print a color image or to print a monochromatic image is determined. If it is to print a color image, calibration is performed in step S702. Calibration processing performed in step S702 is the same as the processes in steps S602 to S604 or steps S609 to S611 explained with reference to FIG. 6. More specifically, the calibration processing includes processes of outputting a calibration execution instruction to the printing unit 102, displaying a message indicating that calibration is in progress, and waiting for a notification of completion of calibration from the printer 102.

In a case of printing a monochromatic image, the process proceeds to step S703, where whether the printing job currently undergoing includes image data or not is determined. If the printing job includes image data, the process proceeds to step S704, whereas if it does not, the process proceeds to step S707. In step S704, whether or not the number of remaining pages of the printing job currently undergoing is equal or greater than 5 pages is determined. If it is, the process proceeds to step S705 where calibration processing is performed, whereas if it is not, the process proceeds to step S706 where the EAJC flag is set.

In step S707, whether the number of remaining pages of the printing job currently undergoing is equal or more than 20 pages or not is determined. If it is, the process proceeds to step S708 where calibration processing is performed, whereas, if it is not, the EAJC flag is set in step S709.

The reason for immediately performing calibration when printing a color image is that there is a fear of deterioration of image. Further, the reason for immediately performing calibration when the number of remaining pages is equal or greater than 5 pages if image data is included in the printing job, whereas performing calibration when the number of remaining pages is equal or greater than 20 pages if image data is not included in the printing job is that it takes time to print images which include image data.

By automatically determining execution time of calibration as described above, calibration is performed at the optimized time depending upon the state of a printing job which is undergoing at the time when calibration is requested.

Note, in the first embodiment, when execution time of calibration is automatically set, it is determined on the basis of whether a printing job is to print a color image or to print a monochromatic image, whether or not image data is included in the printing job, and the number of pages of the printing job being in progress. However, other parameters may be used for determining execution time of calibration. For example, a factor which affects determination on whether a printing job is to be immediately processed or not may be used as a parameter for determining execution time of calibration. Further, other determination methods are possible.

Furthermore, the numbers of pages of the printing job used for determining execution time of calibration are not limited to those used in the first embodiment.

The numbers of pages of the printing job used for determining execution time of calibration in the second embodiment are not limited to those described above, neither.

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 15:
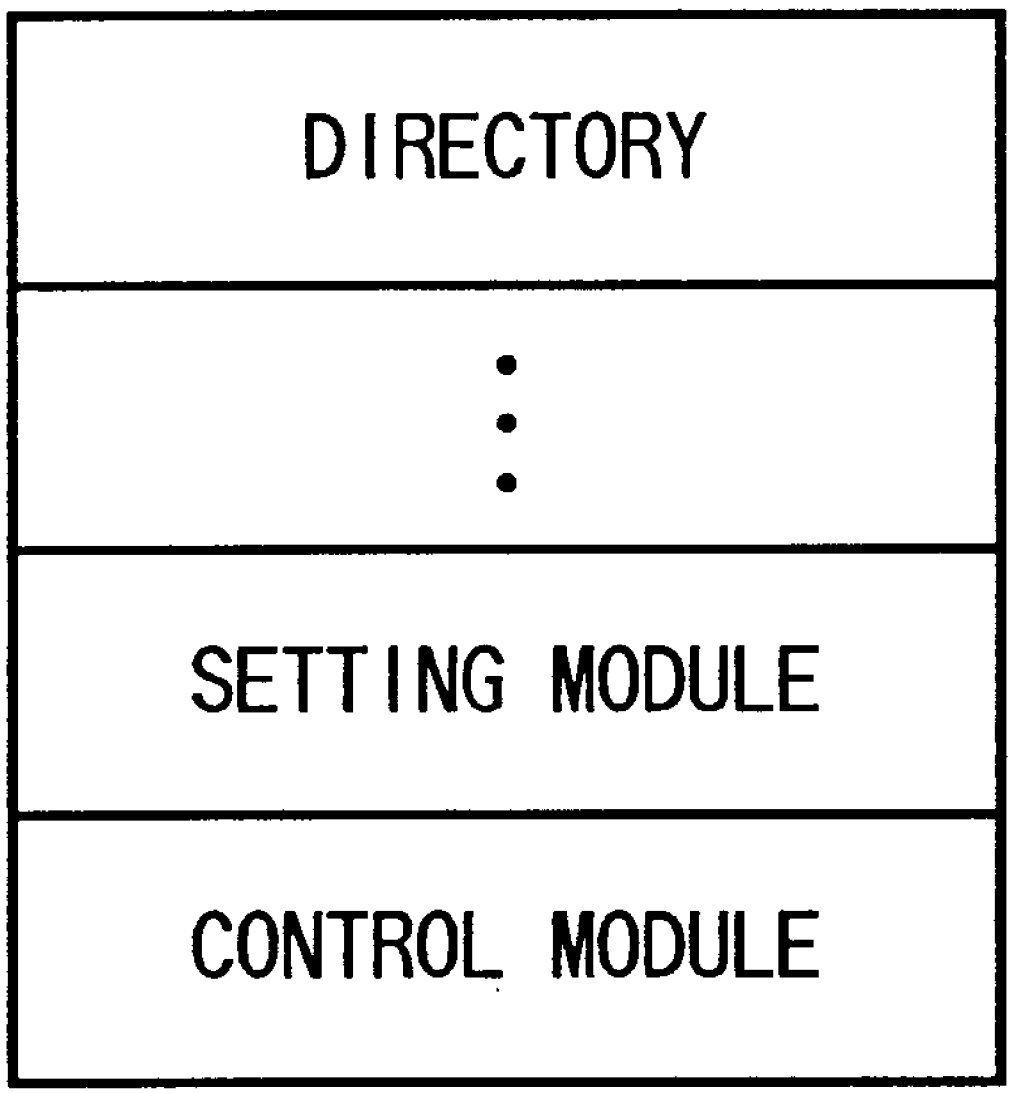
FIG. 15 shows a memory map of a program realizing a control algorithm according to embodiments.

In a case where the present invention is applied to the aforesaid storage medium, the storage medium stores program codes corresponding to the flowcharts described in the embodiments. Briefly, the storage medium stores each module shown as an example of a memory map in FIG. 15.

More specifically, program codes which correspond to a setting module for setting execution time of calibration, and a control module for executing calibration at set time when calibration is requested from a printer, at least, are to be stored in the storage medium.

As described above, an image processing apparatus and method of the present invention control the execution time of calibration. Therefore, depending upon types of printing jobs, e.g., an urgent printing job and a printing job requiring quality, and the conditions of the printing apparatus, it is possible to achieve optimized operational environment for each printing job.

Further, when there is no instruction to perform calibration by a user, it is possible to determine optimized execution time of calibration depending upon each printing job and printing conditions and execute the calibration at the determined time.

The present invention is not limited to the above embodiments and various changes and modifications can be made within the spirit and scope of the present invention. Therefore to appraise the public of the scope of the present invention, the following claims are made.

What is claimed is:

1. An image processing apparatus for controlling a printer having a calibration function by performing bidirectional communication with the printer, said apparatus comprising:

setting means for setting an execution condition of calibration based on a user's instruction; and control means for controlling performance of calibration based on the execution condition and a condition of a job being executed when calibration is requested by the printer.

2. The image processing apparatus according to claim 1, wherein if the number of unprocessed pages in the job is equal to or greater than a predetermined number, said control means immediately initiates the calibration, while if the number of unprocessed pages in the job is less than the predetermined number, said control means initiates the calibration after job completion.

3. The image processing apparatus according to claim 1, further comprising mode setting means for selecting among a plurality of modes based on the user's instruction, wherein said modes include:

(i) a mode for controlling the performance of the calibration in accordance with the execution condition and the condition of the job being executed;

(ii) a mode for immediately executing the calibration; and (iii) a mode for executing the calibration after job completion.

4. The image processing apparatus according to claim 1, wherein the printer adopts an electrophotographic method, and the calibration includes calibration of a density of an image formed with developer.

5. An image processing method for controlling a printer having a calibration function, comprising:

a setting step of setting an execution condition of calibration based on a user's instruction; and a control step of controlling performance of calibration based on the execution condition and a condition of a job being executed when calibration is requested by the printer.

6. The image processing method according to claim 5, wherein if the number of unprocessed pages in the job is equal to or greater than a predetermined number, the calibration is immediately initiated in said control step, while if the number of unprocessed pages in the job is less than the predetermined number performance of calibration is controlled in said control step such that the calibration is performed after job completion.

7. The image processing method according to claim 5, further comprising the step of mode setting for selecting among a plurality of modes based on the user's instruction, wherein said modes include:

(i) a mode for controlling the performance of the calibration in accordance with the execution condition and the condition of the job being executed;

(ii) a mode for immediately executing the calibration; and (iii) a mode for executing the calibration after job completion.

8. The image processing method according to claim 5, wherein the printer adopts an electrophotographic method, and the calibration includes calibration of a density of an image formed with developer.

9. A computer-readable medium on which are stored program codes by which a computer executes process steps for controlling a printer having a calibration function, said process steps comprising:

a setting step to set an execution condition of calibration based on a user's instruction; and a control step to control performance of calibration based on the execution condition and a condition of a job being executed when calibration is requested by the printer.

10. The computer-readable medium according to claim 9, wherein if the number of unprocessed pages in the job is equal to or greater than a predetermined number, the calibration is immediately initiated in said control step, while if the number of unprocessed pages in the job is less than the predetermined number, performance of calibration is controlled in said control step such that the calibration is performed after job completion.

11. The computer-readable medium according to claim 9, wherein said process steps further comprise the step of mode setting for selecting among a plurality of modes based on the user's instruction, wherein said modes include:

(i) a mode for controlling the performance of the calibration in accordance with the execution condition and the condition of the job being executed;

(ii) a mode for immediately executing the calibration; and (iii) a mode for executing the calibration after job completion.

12. The computer-readable medium according to claim 9, wherein the printer adopts an electrophotographic method, and the calibration includes calibration of a density of an image formed with developer.

13. An image processing apparatus for controlling a printer having a calibration function by performing bidirectional communication with the printer, said apparatus comprising:

receiving means for receiving a calibration request signal from a printer;

determining means for determining a job content or a job execution state; and deciding means for deciding whether or not calibration is to be immediately performed based on the job execution state.

14. The image processing apparatus according to claim 13, wherein said image processing apparatus connects with the printer via a communication line.

15. The image processing apparatus according to claim 13, wherein the job content indicates whether or not the job includes color output.

16. The image processing apparatus according to claim 13, wherein the job execution state indicates a number of unprocessed pages.

17. An image processing method for controlling a printer having a calibration function, comprising:

receiving a calibration request signal from a printer;

determining a job content or a job execution state; and deciding whether or not calibration is to be immediately performed based on the job execution state.

18. A computer-readable medium on which are stored program codes by which a computer executes process steps for controlling a printer having a calibration function, said process steps comprising:

receiving a calibration request signal from a printer;

determining a job content or a job execution state; and deciding whether or not calibration is to be immediately performed based on the job execution state.

* * * * *

UNITED STATES PATENT AND TRADEMARK OFFICE
CERTIFICATE OF CORRECTION

PATENT NO. : 5,950,036

DATED : September 7, 1999

INVENTOR(S) : Jun KONISHI

It is certified that error appears in the above-identified patent and that said Letters Patent is hereby corrected as shown below:

On the title page,
Item

[75] INVENTOR
 "Kanagawa-ken" should read --Yokohama-shi--.
Item

[57] ABSTRACT
 Line 3, "at" should read --at a--.

COLUMN 7
 Line 7, "the" should read --are the--.

COLUMN 9
 Line 53, "the" should be deleted.

Signed and Sealed this

Fifth Day of December, 2000

Attest:

Q. TODD DICKINSON

Attesting Officer

Director of Patents and Trademarks